(12) United States Patent
Horesh (10) Patent No.: US 11,861,384 B2
(45) Date of Patent: Jan. 2, 2024

(54) METHODS AND SYSTEMS FOR GENERATING RECOMMENDATIONS BASED ON EXPLAINABLE DECISION TREES FOR USERS OF A SOFTWARE APPLICATION

(71) Applicant: INTUIT INC., Mountain View, CA (US)

(72) Inventor: Yair Horesh, Kfar-Saba (IL)

(73) Assignee: INTUIT INC., Mountain View, CA (US)

( * ) Notice: Subject to any disclaimer, the term of this patent is extended or adjusted under 35 U.S.C. 154(b) by 101 days.

(21) Appl. No.: 17/700,191

(22) Filed: Mar. 21, 2022

(65) Prior Publication Data
US 2023/0297399 A1  Sep. 21, 2023

(51) Int. Cl.
*G06F 9/451* (2018.01)
*G06N 5/01* (2023.01)
*G06N 20/00* (2019.01)
*G06F 17/00* (2019.01)

(52) U.S. Cl.
CPC .............. *G06F 9/453* (2018.02); *G06N 5/01* (2023.01); *G06N 20/00* (2019.01)

(58) Field of Classification Search
CPC ........... G06F 9/453; G06F 17/00; G06N 5/01; G06N 20/00
See application file for complete search history.

(56) References Cited

U.S. PATENT DOCUMENTS

| | | | |
|---|---|---|---|
| 2018/0285773 A1* | 10/2018 | Hsiao | G06Q 30/04 |
| 2022/0414489 A1* | 12/2022 | Cahn | G06N 5/022 |
| 2023/0196210 A1* | 6/2023 | Bustelo-Killam | G06N 20/00 706/12 |

OTHER PUBLICATIONS

NPL "Comparison of Multiple Machine Learning Models Based on Enterprise Revenue Forecasting" Published 2021—IEEE—pp. 354-359 (Year: 2021).*

* cited by examiner

*Primary Examiner* — Quoc A Tran
(74) *Attorney, Agent, or Firm* — Patterson + Sheridan, LLP (57) ABSTRACT

Certain aspects of the present disclosure provide techniques for training decision trees representing users of a software application. An example method generally includes generating, from a transaction history data set for a plurality of users of a software application, a plurality of grouped data sets including transactions grouped by counterparty. A plurality of feature vectors are generated from the plurality of grouped data sets. Each feature vector generally corresponds to a user of the plurality of users and includes a plurality of features describing relationships between the user and a plurality of counterparties in a transaction history associated with the user. A decision tree is trained based on the plurality of feature vectors. The decision tree generally includes a plurality of paths terminating in a similar or different classification, and the plurality of paths distinguishes a user associated with the decision tree from other users of the software application.

13 Claims, 5 Drawing Sheets

METHODS AND SYSTEMS FOR GENERATING RECOMMENDATIONS BASED ON EXPLAINABLE DECISION TREES FOR USERS OF A SOFTWARE APPLICATION

INTRODUCTION

Aspects of the present disclosure relate to recommendation generation in software applications, and more specifically generating recommendations based on similarities between decision trees representing different users in a software application.

BACKGROUND

Software applications are generally deployed for use by many users for the performance of a specific function. These applications may be deployed as web applications accessible over the Internet or a private network or as desktop applications including static components executed from a local device and dynamic components executed from content retrieved from a network location. These applications can include financial applications, such as tax preparation applications, accounting applications, personal or business financial management applications, or the like; social media applications; other electronic communications applications; and so on.

Some applications may include components that allow for various messages for goods or services to be presented to a user while the user is interacting with the application (e.g., in an interstitial page between different components of a web application, in a dedicated advertising panel in an application, in electronic communications sent to the user after a user begins interacting with the application, etc.). These messages may be textual messages that require a minimal amount of overhead to add to network communications between a client device and an application. However, some messages may include audio and/or visual components which may impose more overhead for transmitting the message to a client device.

In some cases, the messages presented to a user may be randomly selected by a message placement engine. These messages, however, may be for goods or services that are not relevant to the user. Even where a message may be relevant to a user, the user may not actually qualify for the advertised offer. In either case, i.e., delivering messages to a user that are not relevant to the user or messages for offers that a user is not qualified for, resources (e.g., network bandwidth, user data caps, etc.) are wasted, which that could be used for other productive purposes.

Further, determining the relevance of a message to a user may entail an identification of users of the software application that are similar to the user to whom a message is to be presented. However, identifying similar users may be a difficult task, as similarity metrics between different users can be determined based on a wide variety of factors over broadly defined parameters. Additionally, because many machine learning models are not explainable (i.e., do not provide techniques by which the reasoning for classifying the user to another user of the software application can be evaluated), it may not be possible to determine why or which features result in a particular output from the machine learning model. Thus, the delivery of messages to the user based on similarity metrics calculated between the user and other users of the software application may result in wasted computing resources when irrelevant messages (e.g., offers that are relevant to a different user) are presented to a user of the software application.

Thus, techniques are needed for presenting targeted messaging that is relevant to a user of a software application.

BRIEF SUMMARY

Certain embodiments provide a computer-implemented method for training decision trees representing users of a software application. An example method generally includes generating, from a transaction history data set for a plurality of users of a software application, a plurality of grouped data sets including transactions grouped by counterparty in the transaction history data set. A plurality of feature vectors are generated from the plurality of grouped data sets. Generally, each feature vector generally corresponds to a user of the plurality of users and including a plurality of features describing relationships between the user and a plurality of counterparties in a transaction history associated with the user. A decision tree is trained based on the plurality of feature vectors. The decision tree generally includes a plurality of paths terminating in a similar or different classification, and the plurality of paths distinguishes a user associated with the decision tree from other users of the software application.

Still further embodiments provide a computer-implemented method for generating recommendations in a software application based on identifying similar users represented by decision trees in the software application. An example method generally includes generating, from a transaction history data set for a user of a software application, a grouped data set including transactions grouped by counterparty in the transaction history data set. A feature vector representing the user of the software application is generated from the grouped data set, and the feature vector generally includes a plurality of features describing relationships between the user and a plurality of counterparties in a transaction history associated with the user. Using a decision tree classifier, a first decision tree for the user of the software application is generated based on the feature vector, and a plurality of second decision trees are generated for other users of the software application. Generally, the decision tree classifier is trained to generate a decision tree having a plurality of paths terminating in a similar or different classification, and the plurality of paths distinguishes a user associated with the decision tree with other users of the software application. For each respective decision tree of the plurality of second decision trees for other users of the software application, a distance metric is calculated between the first decision tree to the respective decision tree, and a user associated with respective decision tree is identified as a similar user based on the calculated distance metric and a threshold distance metric. Information identifying similar users from the other users of the software application is output to the user of the software application.

Other embodiments provide processing systems configured to perform the aforementioned methods as well as those described herein; non-transitory, computer-readable media comprising instructions that, when executed by one or more processors of a processing system, cause the processing system to perform the aforementioned methods as well as those described herein; a computer program product embodied on a computer readable storage medium comprising code for performing the aforementioned methods as well as those further described herein; and a processing system comprising means for performing the aforementioned methods as well as those further described herein.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

In various software applications, various recommendations may be made based on similarities between users of the software application. For example, these recommendations may include offers presented to a user of a software application, content related to how to use the software application, and so on. To generate these recommendations, various recommendation engines can be used to first identify a specific group of users into which a current user falls and then to generate recommendations based on membership in the specific group. These recommendation engines may include, for example, various machine learning-based recommendation engines or the like.

The classification of a user into a specific group and generation of offers based on membership in the specific group may, however, not be accurate. While a machine learning model may be capable of classifying a user into one of a plurality of groups for use in generating recommendations for the user, it may be difficult to determine, from the model architecture, whether the classification is correct or incorrect. For example, it may not be known whether the features selected by a designer of a machine learning model as representative of users of the software application are, in fact, representative and useful for classifying a user into one of a plurality of groups. Additionally, while many machine learning models rely on generating embeddings for different users (e.g., low-dimensional data representing the users), it generally may not be known whether an embedding includes relevant information for assigning a user of the software application to a specific group. Thus, the outputs generated by these machine learning models may be assumed to be accurate without any manner by which such accuracy can be determined or even estimated, and thus, irrelevant recommendations may be generated for a user of the software application. The delivery of these recommendations may thus impose resource costs (e.g., bandwidth, processing, etc. for delivering offers to users of the software application) that could be used to support other operations within a software application.

Aspects of the present disclosure provide techniques for generating and using decision trees representative of users of a software application to identify similar users and to generate recommendations based on similarities between users of the software application. As discussed in further detail herein, the decision trees may be generated based on records in a transaction history associated with the user and a plurality of other users. The resulting decision tree, which may include various paths indicating whether a target user is similar to or different from the user associated with the resulting decision tree, may be used to identify similar users based on similarities between these decision trees, based on an assumption that similar users will include transaction data with similar counterparties and will not include transaction data with drastically different counterparties. Based on a determined difference between different decision trees, similar users of a software application can be identified, and various actions can be taken to generate recommendations based on the identified set of similar users.

Because the decision trees leverage transaction history data for various users and are inherently explainable structures that can be validated, aspects of the present disclosure may allow for improved accuracy in identifying similar users in a software application to a subject user of the software application, and may thus improve the relevance of recommendations generated for the subject user. Thus, aspects of the present disclosure improve the user experience of a software application by presenting recommendations that are relevant to the user based on differences between explainable decision tree constructs, which may improve the accuracy with which recommendations are generated for the user of the software application. Further, because the identification of similar users to the user of the software application and the resulting recommendations may be more accurate, embodiments of the present disclosure may reduce the amount of bandwidth used in delivering application content to users of the software application.

Figure 1:
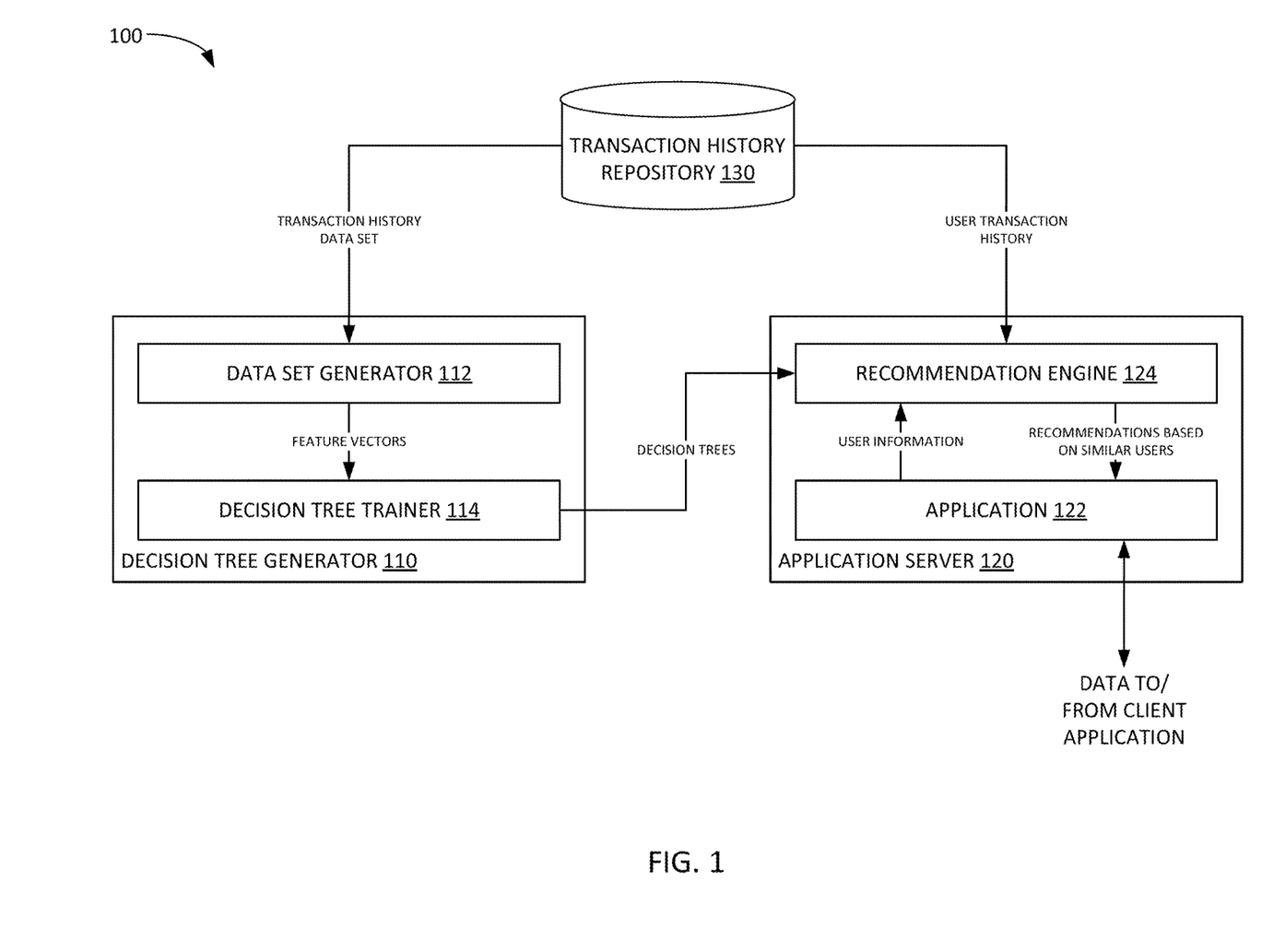
FIG. 1 depicts an example computing environment in which messages are delivered to users of a software application based on similarities between decision trees representing different users of the software application.

Example Training and Using Decision Trees for Generating Recommendations in a Software Application FIG. 1 illustrates an example computing environment 100 in which decision trees for users of a software application are trained and used to generate recommendations for users of a software application. As illustrated, computing environment 100 includes a decision tree generator 110, application server 120, and transaction history repository 130.

Decision tree generator 110 generates data sets that can be used to train decision trees representative of different users of a software application and deploys these decision trees for use in generating recommendations for a user of a software application. Decision tree generator 110 may be any of a variety of computing devices that can generate training data sets and train predictive models based on these training data sets, such as a server computer, a cluster of computers, cloud computing instances, or the like. As illustrated, decision tree generator 110 includes a data set generator 112 and a decision tree trainer 114

Data set generator 112 may be configured to retrieve transaction history data for a plurality of users of a software application from transaction history repository 130 and generate one or more training data sets from the transaction history data. In some cases the one or more training data sets may include training data sets for each user of a plurality of users of the software application, and each training data set may be used (as discussed in further detail below) to train a decision tree for a specific user of the software application. To generate a transaction history data set for a user of the software application, data set generator 112 can retrieve, from transaction history repository 130, information about the counterparties in a user's transaction history for use in generating a plurality of grouped data sets. Based on the information about the counterparties in a user's transaction history, data set generator 112 can retrieve transaction history data from the transaction history repository for the counterparties and for a randomly selected group of non-counterparties (e.g., parties with which a user does not have a relationship recorded in the user's transaction history) for use in generating a labeled training data set to use in generating a decision tree for a specific user of the software application.

Each grouped data set may include transactions grouped by counterparty or class of counterparty in the transaction history data set for a user of the software application. For example, to generate the grouped data set, data set generator 112 may be configured to generate groups of transactions based on the user's identifying information (e.g., email address, national identification number, etc.) as a primary key and the counterparty's identifying information as a secondary key. In some aspects, each grouped data set may be organized based on other characteristics, such as commonalities between different counterparties (e.g., similar party classifications, as embodied in classification codes (e.g., the first two digits of a North American Industry Classification System (NAICS) code) assigned to these counterparties, similar sizes (e.g., in terms of numbers of employees, annual revenue, annual profit, etc.), and the like)). In some aspects, a grouped data set may further be organized based on information characterizing a relationship between a user and a group of users in the transaction history data set, such as how the user settles transactions with the group of users. One grouped data set may correspond to a group of users for whom the user settles transactions in cash or check, while another grouped data set may correspond to a group of users for whom the user settles transactions by credit card, while still another grouped data set may correspond to a group of users for whom the user settles transactions by a wire transfer (e.g., via Fedwire ACH, SWIFT, etc.).

After sorting a transaction history for a user into a plurality of grouped data sets, a plurality of feature vectors may be generated from the grouped data sets. Each feature vector, which may be associated with a particular user, may include information derived from a respective grouped data set corresponding to the transactions between a user and a given counterparty in the user's transaction history. For example, a feature vector that describes a user's relationship with a given counterparty may include information such as frequency information identifying a periodicity of transactions with the counterparty in the transaction history, frequency information identifying a periodicity of transactions with similar-sized counterparties in the transaction history data set, volume information for a number of transactions between the user and a counterparty, payment information for transactions between the user and a counterparty, and the like.

The features included in feature vectors generated for the user of the software application may be selected, for example, based on assumptions that similar users will have similar interactions with similar-sized counterparties, similarly sized transactions, and similar numbers of transactions with these counterparties, while users that are different from a specific user will have different interactions with these counterparties or interact with other counterparties than those with which the specific user interacts. Of course, it should be recognized that these are but examples of data that may be included in a feature vector, and other data points summarizing a user's relationship with its counterparties may additionally or alternatively be included in a feature vector. For example, features included in a feature vector may be selected so that the subsequently generated decision trees characterize a risk metric for a user of the software application, can be used to generate recommendations to improve a user's financial state, or the like.

Decision tree trainer 114 generally trains a plurality of decision trees based on the feature vectors generated by data set generator 112. Generally, decision tree trainer 114 may generate a decision tree for each user of a plurality of users in the software application, and each respective decision tree may be considered representative of a user of the software application with which the respective decision tree is associated. To generate a decision tree that characterizes a user of a plurality of users in the software application, decision tree generator 114 can select, from the set of feature vectors generated by data set generator 112, feature vectors associated with the user and a randomly selected set of feature vectors. The randomly selected set of feature vectors may be selected so that a suitable universe of users that are different from the user of the software application are used in generating the decision tree for the user of the software application. For example, the randomly selected set of feature vectors may include feature vectors associated with the user may include feature vectors for counterparties of the user of the software application and feature vectors for non-counterparties to the user (e.g., users for whom no records exist in the user's transaction history). The feature vectors may include, for example, values for the features discussed above which represent characteristics of transactions with a counterparty or group of counterparties, labeled with an indication of whether the feature vector is associated with the user or with a different user.

A decision tree for the user may then be trained or generated based on the selected set of feature vectors. To train the decision tree for the user, decision tree trainer 114 can select a feature as a root node and generate a tree by progressively splitting the decision tree based on the values of other features in the set of feature vectors. A feature, and the value on which the feature is split to generate different paths in the decision tree, may be selected based on various metrics, such as an entropy metric that characterizes a level of uncertainty in a group of observations, an information gain metric which characterizes a measure of an amount of information that is provided by a feature, or the like.

For example, a feature and its associated splitting value may be selected based on a minimization of an entropy metric or maximization of an information gain metric. Because the decision tree may be generated based on explainable metrics, such as minimization of entropy or maximization of information gain, the decision tree generated by decision tree trainer 114 may be considered an explainable structure, or explainable embedding, that characterizes the unique features of a user of the software application. Further the decision tree may be considered explainable because of the inherent structure of these trees, where paths in a decision tree including different combinations of values represent different classifications or characterizations of a user of the software application.

In some aspects, the decision tree may be trained up to a defined tree depth which may generate a compact tree representing a user of the software application. For example, the decision tree may be trained to a depth of four or five edges from a root node of the tree to a terminal node of the tree, which may promote rapid generation (or training) of the decision tree for a user and allow for the generation of a compact, explainable structure that characterizes the user of the software application.

In some aspects, decision tree generator 110 may generate the feature vectors and decision trees for users of a software application on demand and may generate a set of decision trees for other users of the software application in advance. The other users for whom decision trees are generated may, for example, include users with extensive transaction histories, randomly selected users from the software application, or the like.

After generating the decision trees for a plurality of users, decision tree trainer 114 can deploy the decision trees to an application server 120 for use.

Application server 120 generally hosts an application which may be accessed by users of the application and may provide a set of functions to users of the application. As illustrated, application server 120 includes an application 122 and recommendation engine 124.

In some aspects, during execution of the application 122, application 122 may determine that a user should be presented a recommendation based on the user's similarity to other users of the software application. Such a determination may be made, for example, based on user interaction with the application 122 indicating that a user is transitioning from one workflow in the application 122 to another workflow in the application 122, based on an amount of time spent within the application, or the like. When such a determination is made, application 122 can provide information about the user to recommendation engine 124 and instruct recommendation engine 124 to identify users who are similar to the user of the application 122 and generate recommendations to the user based on the identified similar users.

Recommendation engine 124 generally receives the user information from application 122 and determines whether a decision tree exists for the user (e.g., from a set of decision trees deployed to application server 120). If a decision tree does not exist for the user, recommendation engine 124 can request that decision tree generator 110 generate a decision tree for the user, as discussed above. Recommendation engine 124 can proceed with identifying similar users to the user after receiving the decision tree for the user from decision tree generator 110.

Because the decision tree for a user characterizes that user in terms of specific features and values of those features that indicate whether a specific user is the same as or different from the user associated with the decision tree, comparisons between decision trees can be used to determine whether two users (represented by their respective decision trees) are similar. Various distance metrics can be used to determine whether two users are similar to each other. In one example, a Jaccard index may be calculated on the features included in the decision trees associated with the user of application 122 and another user. The Jaccard index may be calculated based on the number of features that overlap between the decision trees associated with the user of application 122 and another user and the number of features that appear in at least one of the decision trees. Generally, larger values may indicate a closer match between the decision tree for the user of the application 122 and another user for whom a decision tree has already been generated.

In another example, the distance metric may be calculated based on the number of similar predictions that are made by each decision tree. Each decision tree associated with a respective user in a universe of other users of the software application may be associated with a subset of counterparties that are classified as similar to the respective user. To determine, thus, whether the respective user is similar to the user of application 122, the subset of counterparties may be analyzed against the decision trees for the respective user and the user of application 122. The number of these counterparties in the subset of counterparties that result in the generation of a similar classification using both the decision trees for the respective user and the user of application 122 may be recorded and used as a distance metric. The distance metric may be a raw number, a proportion of counterparties that result in the generation of a similar classification using both the decision trees to the total number of counterparties in the subset of counterparties, or the like.

Generally, if a distance metric is less than a threshold value, recommendation engine 124 can determine that the user of application 122 is similar to another user of the application. Recommendation engine 124 may aggregate the information about the users identified as similar to the user of application 122 and output that information to the user of application 122. For example, recommendation engine 124 may output information identifying the similar users and information explaining a level of similarity between the user and the similar users based on the calculated distance metrics between the user and the similar users. By doing so, recommendation engine 124 can provide information to a user of application 122 showing information about similar users and, in some aspects, information about actions that have been taken within the software application by these similar users that may also be relevant to the user of application 122.

In some aspects, recommendation engine 124 may additionally generate one or more recommendations for the user of the application 122 based on the identified set of similar users to the user of the application 122. These recommendations may include, for example, suggestions of actions to take within the software application (e.g., generating reports that similar users have generated previously; viewing help content that similar users have found helpful, etc.), actions to take with respect to the user's transaction history (e.g., applying for a loan product), and so on. In doing so, recommendation engine 124 can examine a set of recommendations that may have previously been presented to the identified set of similar users and select one or more recommendations from the set of recommendations to present to the user of the application 122. The set of recommendations may be selected, for example, based on an assumption that recommendations relevant to the users in the identified set of similar users will also be relevant to the user of the application 122.

In some aspects, one or more additional recommendation engines may be used to select a specific recommendation to present to the user of application 122 based on other information, such as other user characteristics (e.g., from a user profile used within application 122 to customize the user's experience when using application 122), transactions in the user's transaction history, and the like.

Example Decision Tree Representing a User of a Software Application

Figure 2:
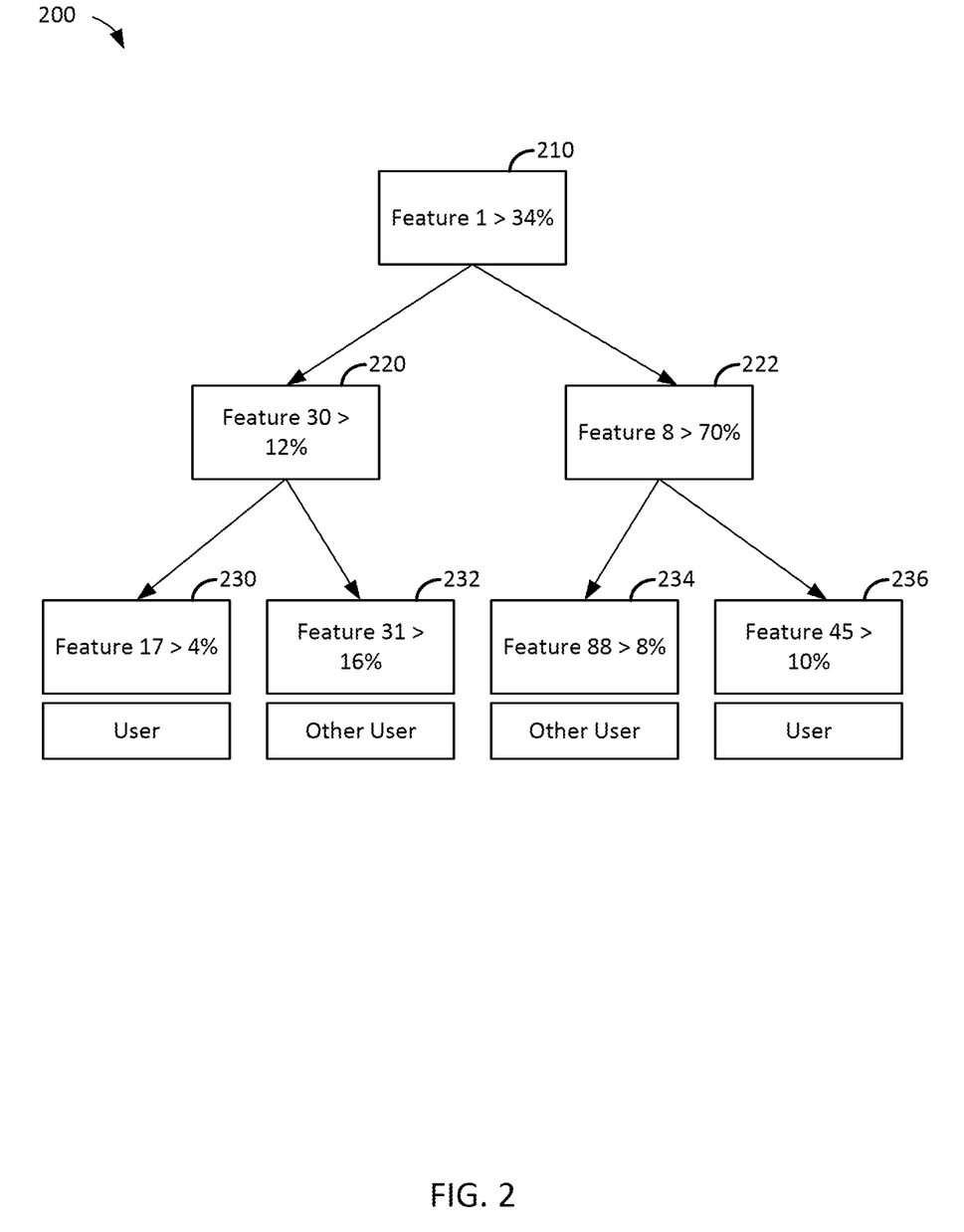
FIG. 2 illustrates an example decision tree representing a user of a software application.

FIG. 2 illustrates an example decision tree 200 representing a user of a software application, according to aspects of the present disclosure. As illustrated, decision tree 200 is a tree with a depth of 2 (as in, two edges from root node to leaf node); however, it should be recognized that decision tree 200 may be of any suitable depth that allows for a user to be represented by the decision tree. Generally, depth and compactness may be inversely related; a deeper tree may be less compact but may include more information that can be used to classify a user of the software application as similar to or different from the user with which the decision tree is associated, while a shallower tree may be more compact but include less information that can be used to classify a user.

As illustrated, decision tree 200 begins at a root node 210, in which the split value for a given feature (feature 1) is set at 34 percent. If the value for feature 1 for a user being analyzed through decision tree 200 is less than or equal to 34 percent, then the decision tree may proceed down the left side of the tree to node 220. Otherwise, the decision tree may proceed down the right side of the tree to node 222.

At node 220, the split value for feature 30 is set a 12 percent. Like at root node 210, a value for feature 30 for a user being analyzed through decision tree 200 being less than the split value may cause the decision tree to proceed down the left side to node 230. Otherwise, the decision tree may proceed down the right side of the tree to node 232. At node 230, the split value for feature 17 is 4%. If the value for feature 17 for the user being analyzed exceeds 4%, the decision tree may result in a classification of the user being analyzed being the same user as that associated with the decision tree. At node 232, meanwhile, if the value for feature 31 exceeds the split value for this feature, the decision tree may result in a classification of the user being analyzed as a user different from the user associated with the decision tree. Similar decisions may be made with respect to nodes 222, 234, and 236 to result in a decision of whether a user is similar to or different from the user associated with decision tree 200.

Another user of the software application may be associated with a decision tree that includes different feature values and/or different split values for given features within the user's transaction history. Generally, a user with different split values, but the same features, in the decision tree may be considered more similar to a target user than a user with different features in the decision tree. Further, as discussed herein, classifications of users into similar and different classifications using different decision trees can be used to determine a level of similarity between users of the software application. For example, large degrees of overlap between the classifications generated using different decision trees may indicate that two users, represented by two different decision trees, are similar, while small degrees of overlap or no overlap between the classifications generated using different decision trees may indicate that the users represented by these decision trees are different. Further, while FIG. 2 illustrates a binary tree, it should be recognized that a decision tree generated according to the techniques described herein may be an n-ary tree, with each node being associated with any number of child nodes.

Figure 3:
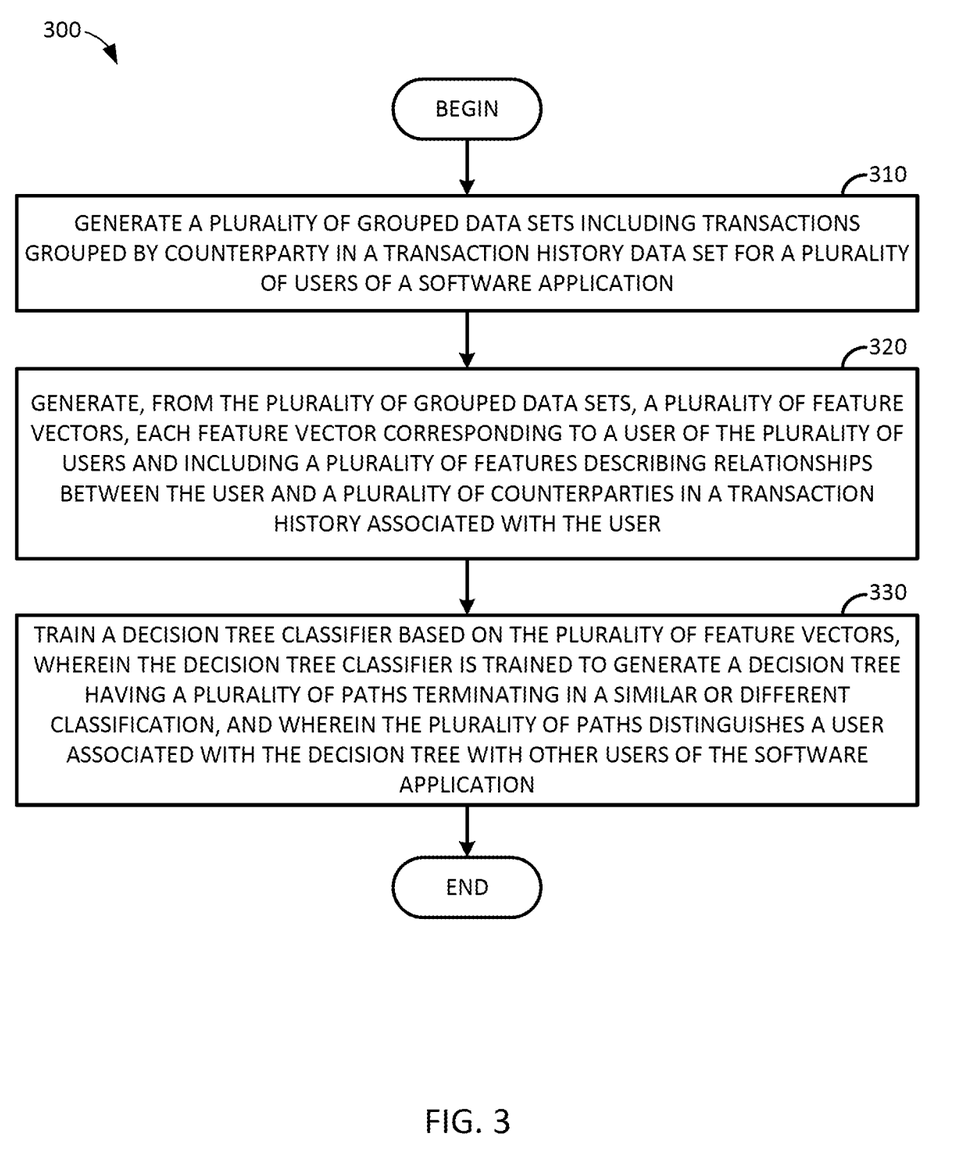
FIG. 3 illustrates example operations for training a decision tree representing a user of a software application.

Example Methods for Training Decision Trees Representing Users of a Software Application and Identifying Similar Users of a Software Application Using Decision Trees FIG. 3 illustrates example operations 300 that may be performed to generate decision trees representing users of a software application, according to aspects of the present disclosure. Operations 300 may be performed, for example, by decision tree generator 110 illustrated in FIG. 1, system 500 illustrated in FIG. 5, and/or other computing systems on which decision trees can be generated.

As illustrated, at block 310, operations 300 begin with generating, from a transaction history data set for a plurality of users of a software application, a plurality of grouped data sets. Generally, the plurality of grouped data sets may include transactions grouped by counterparty in the transaction data set.

In some aspects, to generate the plurality of grouped data sets, a plurality of records may be generated for each respective user of a plurality of users of the software application. Each record may include an identifier of the respective user as a primary key and an identifier of a unique counterparty as a secondary key. By doing so, transactions between different users in the software application may be grouped together in a single group of transactions.

At block 320, operations 300 proceed with generating a plurality of feature vectors from the plurality of grouped data sets. Each feature vector of the plurality of feature vectors may correspond to a specific user of the plurality of users. A feature vector generally includes a plurality of features describing relationships between the user and a plurality of counterparties in a transaction history associated with the user. These feature vectors, in some aspects, be generated, for a respective grouped data set from the plurality of grouped data set, with information derived from counterparties in the transaction history data set.

Generally, the vector may include a variety of data points representing information about a user's relationships with a counterparty or group of counterparties in the user's transaction history. For example, the vector may include frequency information for a group of counterparties in the transaction history data set. The frequency information may indicate, for example, a periodicity at which a user interacts with counterparties in the group of counterparties, a periodicity at which transactions with different sets of sizes are performed between the user and counterparties in the group of counterparties, or the like. The vector may, in some aspects, include volume information for a number of transactions performed between the user and each group of counterparties in the transaction history set. In some aspects, the vector may include payment information for transactions between the user and the group of counterparties in the transaction history data set. For example, the vector may include information identifying a number or proportion of transactions settled between the user and the group of counterparties using cash or check, using a credit card, using electronic payment mechanisms such as Fedwire ACH or SWIFT, and the like.

At block 330, operations 300 proceed with training a decision tree based on the plurality of feature vectors. These decision tress may then be deployed, for example, to an application server for use in identifying similar users to a given user of a software application hosted on the application server, generating recommendations for users of the software application based on an identification of similar users, and the like. The decision tree may include a plurality of paths terminating in a similar or different classification. Each path of the plurality of paths may distinguish a user associated with the decision tree with other users of the software application.

In some aspects, the decision tree may be trained based on a feature vector for a selected user of the software application and a randomly selected set of feature vectors from the plurality of feature vectors. The randomly selected set of feature vectors may include a first set of feature vectors associated with counterparties of the selected user and a second set of feature vectors identified as non-counterparties to the selected user. The decision tree may be trained for a specified tree depth based on the feature vector for the selected user and the randomly selected set of feature vectors. This specified tree depth may be defined a priori as a tradeoff between an amount of detail in the decision trees generated for users in the software application and a size of these decision trees.

Figure 4:
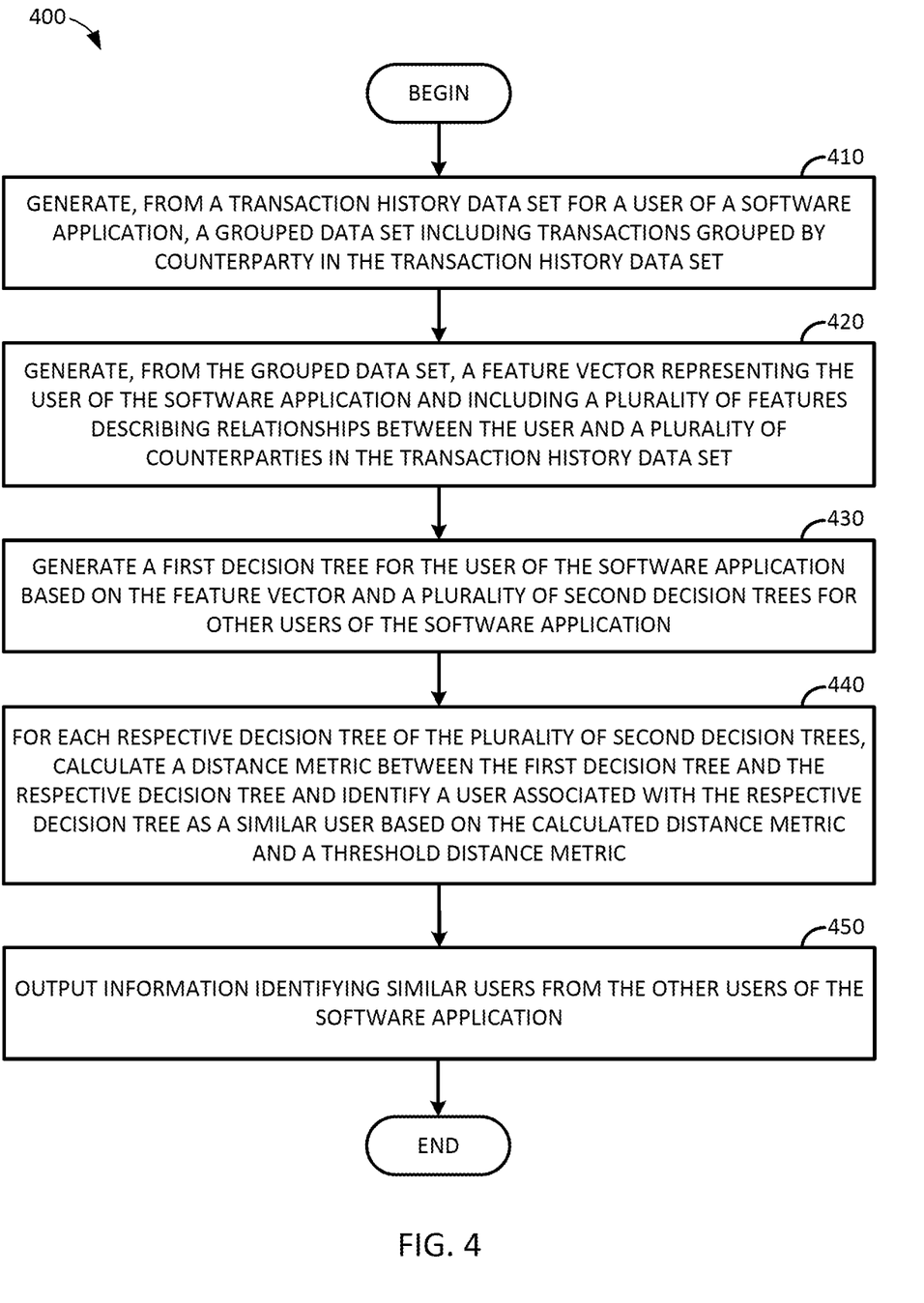
FIG. 4 illustrates example operations for identifying similar users in a software application based on similarities between decision trees representing different users of a software application.

FIG. 4 illustrates example operations 400 that may be performed to identify similar users in a software application based on similarities between decision trees representing different users of the software application. Operations 400 may be performed, for example, by decision tree generator 110 and application server 120 illustrated in FIG. 1, system 500 illustrated in FIG. 5, and/or other computing systems on which decision trees can be generated and used to determine a similarity between different users of the software application.

As illustrated, at block 410, operations 400 begin with generating, from a transaction history data set for a user of a software application, a grouped data set. The grouped data set generally includes transactions grouped by counterparty in the transaction history data set.

In some aspects, to generate the grouped data set for the user of the software application, a plurality of records may be generated for the user of the software application. Each record may include an identifier of the respective user as a primary key and an identifier of a unique counterparty as a secondary key. By doing so, transactions between different users in the software application may be grouped together in a single group of transactions.

At block 420, operations 400 proceed with generating, from the grouped data set, a feature vector representing the user of the software application and including a plurality of features describing relationships between the user and a plurality of counterparties in the transaction history data set. These feature vectors, in some aspects, be generated, for a respective grouped data set from the plurality of grouped data set, with information derived from counterparties in the transaction history data set.

Generally, the vector may include a variety of data points representing information about a user's relationships with a counterparty or group of counterparties in the user's transaction history. For example, the vector may include frequency information for a group of counterparties in the transaction history data set. The frequency information may indicate, for example, a periodicity at which a user interacts with counterparties in the group of counterparties, a periodicity at which transactions with different sets of sizes are performed between the user and counterparties in the group of counterparties, or the like. The vector may, in some aspects, include volume information for a number of transactions performed between the user and each group of counterparties in the transaction history set. In some aspects, the vector may include payment information for transactions between the user and the group of counterparties in the transaction history data set. For example, the vector may include information identifying a number or proportion of transactions settled between the user and the group of counterparties using cash or check, using a credit card, using electronic payment mechanisms such as Fedwire ACH or SWIFT, and the like.

At block 430, operations 400 proceed with generating, using a decision tree classifier, a first decision tree for the user of the software application based on the feature vector. A plurality of second decision trees may also be generated for other users of the software application. The first decision tree and the plurality of second decision trees may generally comprise trees having a plurality of paths terminating in a similar or different classification, and wherein the plurality of paths distinguishes a user associated with a decision tree with other users of the software application. The first decision tree and the plurality of second decision trees may generally be trees generated to a defined depth (e.g., a depth of four edges or a depth of five edges between the root node of the decision tree and a terminal node of the decision tree)

At block 440, operations 400 proceed with calculating, for each respective decision tree of the plurality of second decision trees for other users of the software application, a distance metric between decision trees and identifying users associated with decision trees as similar users to the user of the software application based on the calculated distance metric. As discussed, a distance metric between different decision trees may be calculated based on a Jaccard index or based on the number of similar predictions that are made by each decision tree. If the distance metric calculated between the first decision tree and the respective decision tree is less than a threshold distance, the user associated with the respective decision tree may be deemed similar to the user of the software application. Otherwise, the user associated with the respective decision tree may be deemed to not be sufficiently similar.

At block 450, operations 400 proceed with outputting, to the user of the software application, information identifying similar users from the other users of the software application. In some aspects, the information identifying these similar users may include information explaining a level of similarity between the user and the identified similar users. This information may be based on the calculated distance metrics between the user and the identified similar users. In some aspects, the information identifying these similar users may be output with users with the highest degree of similarity to the user of the software application output before users with lower degrees of similarity.

In some aspects, one or more recommendations may be generated and output to the user of the software application based on the information identifying similar users from the other users of the software application. For example, recommendations may be made based on recommendations presented to these similar users, based on an assumption that recommendations that are relevant to similar users will also be relevant to the user of the software application. In some aspects, one or more additional recommendation engines may be used to select a specific recommendation to present to the user of the software application from a universe of potentially relevant recommendations based on other information, such as other user characteristics (e.g., from a user profile used within the software application to customize the user's experience when using the software application), transactions in the user's transaction history, and the like.

Figure 5:
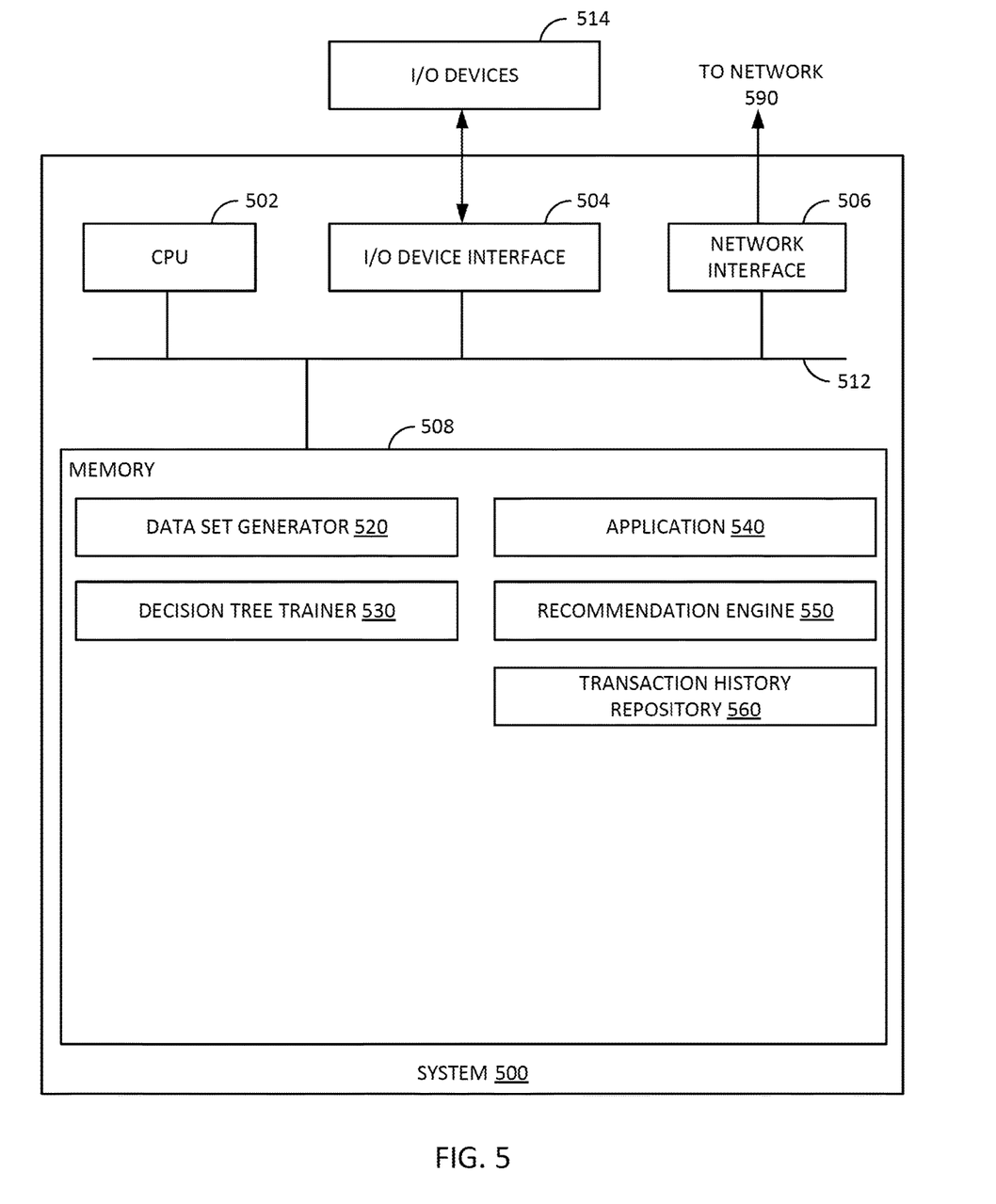
FIG. 5 illustrates an example system on which embodiments of the present disclosure can be performed.

Example Systems for Training Decision Trees Representing Users of a Software Application and Identifying Similar Users of a Software Application Using Decision Trees FIG. 5 illustrates an example system 500 in which decision trees are trained and used to identify similar users of a software application. System 500 may correspond to one or both of decision tree generator 110 and application server 120 illustrated in FIG. 1. While FIG. 5 illustrates a system in which decision trees can be generated (trained) and used to identify similar users of the software application on a same system, a single system need not implement both components for generating (training) these decision trees and using these decision trees to identify similar users of the software application.

As shown, system 500 includes a central processing unit (CPU) 502, one or more I/O device interfaces 504 that may allow for the connection of various I/O devices 514 (e.g., keyboards, displays, mouse devices, pen input, etc.) to the system 500, network interface 506 through which system 500 is connected to network 590 (which may be a local network, an intranet, the internet, or any other group of computing devices communicatively connected to each other), a memory 508, and an interconnect 512.

CPU 502 may retrieve and execute programming instructions stored in the memory 508. Similarly, the CPU 502 may retrieve and store application data residing in the memory 508. The interconnect 512 transmits programming instructions and application data, among the CPU 502, I/O device interface 504, network interface 506, and memory 508.

CPU 502 is included to be representative of a single CPU, multiple CPUs, a single CPU having multiple processing cores, and the like.

Memory 508 is representative of a volatile memory, such as a random access memory, or a nonvolatile memory, such as nonvolatile random access memory, phase change random access memory, or the like. As shown, memory 508 includes a data set generator 520, decision tree trainer 530, application 540, recommendation engine 550, and transaction history repository 560.

Data set generator 520 generally corresponds to data set generator 112 illustrated in FIG. 1. Generally, data set generator 520 uses a transaction history data set from transaction history repository 560 to generate feature vectors that can be used to train decision tree models representing users of a software application. The feature vectors may be generated based on grouped data sets in which transactions from the transaction history repository 560 are grouped based on counterparties in the transaction history repository. The feature vectors generally include features that describe relationships between a user of the software application and different counterparties or groups of counterparties.

Decision tree trainer 530 generally corresponds to decision tree trainer 114 illustrated in FIG. 1. Generally, decision tree trainer 530 uses the feature vectors generated by data set generator 520 to train decision trees that represent users of a software application. Generally, each user of a set of users may be associated with a unique decision tree and may be generated up to a defined depth based on feature vectors for the selected user and a randomly selected set of feature vectors for counterparties to the selected user and non-counterparties to the selected user.

Application 540 generally corresponds to application 122 illustrated in FIG. 1. Generally, application 540 receives requests from users of the application 540 for various features or functionality of the application and presents recommendations generated by recommendation engine 550 to the users of the application.

Recommendation engine 550 generally corresponds to recommendation engine 124 illustrated in FIG. 1. Generally, recommendation engine 550 uses the decision trees trained by decision tree trainer 530 and user transaction data retrieved from transaction history repository 560 to identify users who are similar to a selected user of the software application. Users may be identified as similar to the selected user of the software application based on various distance metrics between decision trees associated with the users of the software application. Based on the identified set of similar users to the selected user of the software application, recommendation engine 550 can output information about the identified set of similar users as well as recommendations that are potentially relevant to the selected user of the software application. These recommendations may be selected from a set of recommendations presented to users in the identified set of similar users based on a presumption that these recommendations will also be relevant to the selected user, and the recommendations may be selected at random or by one or other recommendation generation models that use additional information about the selected user to identify relevant recommendations to deliver to the selected user of the software application.

Note that FIG. 5 is just one example of a system, and other systems including fewer, additional, or alternative components are possible consistent with this disclosure.

Example Clauses

Implementation examples are described in the following numbered clauses:

Clause 1: A method, comprising: generating, from a transaction history data set for a plurality of users of a software application, a plurality of grouped data sets including transactions grouped by counterparty in the transaction history data set; generating, from the plurality of grouped data sets, a plurality of feature vectors, each feature vector corresponding to a user of the plurality of users and including a plurality of features describing relationships between the user and a plurality of counterparties in a transaction history associated with the user; and training decision trees for each user of the plurality of users based on the plurality of feature vectors, wherein each decision tree comprises a plurality of paths terminating in a similar or different classification, and wherein the plurality of paths distinguishes a user associated with a decision tree of the plurality of decision trees with other users of the software application.

Clause 2: The method of Clause 1, wherein generating the plurality of grouped data sets comprises, for each respective user of the plurality of users of the software application, generating a plurality of records, each record including an identifier of the respective user as a primary key and a unique counterparty as a secondary key.

Clause 3: The method of any one of Clauses 1 or 2, wherein generating the plurality of feature vectors comprises generating, for a respective grouped data set from the plurality of grouped data sets, a vector including information derived from counterparties in the transaction history data set.

Clause 4: The method of Clause 3, wherein the vector comprises one or more of: frequency information for a group of counterparties in the transaction history data set, frequency information for transactions with different sizes of counterparties in the transaction history data set, volume information for a number of transactions performed between the user and each group of counterparties in the transaction history data set, or payment information for transactions between the user and the group of counterparties in the transaction history data set.

Clause 5: The method of any one of Clauses 1 through 4, wherein training the decision trees comprises training the decision trees based on a feature vector for a selected user and a randomly selected set of feature vectors from the plurality of feature vectors, wherein the randomly selected set of feature vectors include a first set of feature vectors identified as counterparties of the selected user and a second set of feature vectors identified as non-counterparties to the selected user.

Clause 6: The method of Clause 5, wherein training the decision trees comprises training the decision trees for a specified tree depth based on the feature vector for the selected user and the randomly selected set of feature vectors.

Clause 7: The method of any one of Clauses 1 through 6, further comprising deploying the decision trees.

Clause 8: A method, comprising: generating, from a transaction history data set for a user of a software application, a grouped data set including transactions grouped by counterparty in the transaction history data set; generating, from the grouped data set, a feature vector representing the user of the software application and including a plurality of features describing relationships between the user and a plurality of counterparties in the transaction history data set; generating a first decision tree for the user of the software application based on the feature vector and a plurality of second decision trees for other users of the software application, wherein the first decision tree and the plurality of second decision trees comprise trees having a plurality of paths terminating in a similar or different classification, and wherein the plurality of paths distinguishes a user associated with a decision tree with other users of the software application; for each respective decision tree of the plurality of second decision trees for other users of the software application: calculating a distance metric between the first decision tree to the respective decision tree, and identifying a user associated with the respective decision tree as a similar user based on the calculated distance metric and a threshold distance metric; and outputting, to the user of the software application, information identifying similar users from the other users of the software application.

Clause 9: The method of Clause 8, wherein generating the grouped data set comprises generating a plurality of records from the transaction history data set, each record including an identifier of the respective user as a primary key and a unique counterparty as a secondary key.

Clause 10: The method of any one of Clauses 8 or 9, wherein generating the feature vector representing the user of the software application comprises generating, based on the grouped data set, a vector including information derived from counterparties in the transaction history data set.

Clause 11: The method of Clause 10, wherein the vector comprises one or more of: frequency information for a group of counterparties in the transaction history data set, frequency information for transactions with different sizes of counterparties in the transaction history data set, volume information for a number of transactions performed between the user and each group of counterparties in the transaction history data set, or payment information for transactions between the user and the group of counterparties in the transaction history data set.

Clause 12: The method of any one of Clauses 8 through 11, wherein the decision trees comprise trees generated to a defined depth.

Clause 13: The method of any one of Clauses 8 through 12, wherein outputting the information identifying similar users from the other users of the software application comprises outputting information explaining a level of similarity between the user and the identified similar users based on the calculated distance metrics between the user and the identified similar users.

Clause 14: The method of any one of Clauses 8 through 13, further comprising outputting, to the user of the software application, recommendations related to the software application based on recommendations delivered the identified similar users.

Clause 15: A system, comprising: a memory having executable instructions stored thereon; and a processor configured to execute the executable instructions to perform the methods of any one of Clauses 1 through 14.

Clause 16: A system, comprising: means for performing the methods of any one of Clauses 1 through 14.

Clause 17: A computer-readable medium having instructions stored thereon which, when executed by a processor, performs the methods of any one of Clauses 1 through 14.

Additional Considerations

The preceding description is provided to enable any person skilled in the art to practice the various embodiments described herein. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

A processing system may be implemented with a bus architecture. The bus may include any number of interconnecting buses and bridges depending on the specific application of the processing system and the overall design constraints. The bus may link together various circuits including a processor, machine-readable media, and input/output devices, among others. A user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media, such as any medium that facilitates transfer of a computer program from one place to another. The processor may be responsible for managing the bus and general processing, including the execution of software modules stored on the computer-readable storage media. A computer-readable storage medium may be coupled to a processor such that the processor can read information from, and write information to, the storage medium. In the alternative, the storage medium may be integral to the processor. By way of example, the computer-readable media may include a transmission line, a carrier wave modulated by data, and/or a computer readable storage medium with instructions stored thereon separate from the wireless node, all of which may be accessed by the processor through the bus interface. Alternatively, or in addition, the computer-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module, it will be understood that such functionality is implemented by the processor when executing instructions from that software module.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method, comprising:
generating, from a transaction history data set for a user of a software application, a grouped data set including transactions grouped by counterparty in the transaction history data set;
generating, from the grouped data set, a feature vector representing the user of the software application and including a plurality of features describing relationships between the user and a plurality of counterparties in the transaction history data set;
generating a first decision tree for the user of the software application based on the feature vector and a plurality of second decision trees for other users of the software application, wherein the first decision tree and the plurality of second decision trees comprise trees having a plurality of paths terminating in a similar or different classification, and wherein the plurality of paths distinguishes a user associated with a decision tree with other users of the software application;
for each respective decision tree of the plurality of second decision trees for other users of the software application:

calculating a distance metric between the first decision tree to the respective decision tree, and identifying a user associated with the respective decision tree as a similar user based on the calculated distance metric and a threshold distance metric; and outputting, to the user of the software application, information identifying similar users from the other users of the software application.

2. The method of claim 1, wherein generating the grouped data set comprises generating a plurality of records from the transaction history data set, each record including an identifier of the user associated with the respective decision tree as a primary key and a unique counterparty as a secondary key.

3. The method of claim 1, wherein generating the feature vector representing the user of the software application comprises generating, based on the grouped data set, a vector including information derived from counterparties in the transaction history data set.

4. The method of claim 3, wherein the vector comprises one or more of:

frequency information for a group of counterparties in the transaction history data set, frequency information for transactions with different sizes of counterparties in the transaction history data set, volume information for a number of transactions performed between the user and each group of counterparties in the transaction history data set, or payment information for transactions between the user and the group of counterparties in the transaction history data set.

5. The method of claim 1, wherein the decision trees comprise trees generated to a defined depth.

6. The method of claim 1, wherein outputting the information identifying similar users from the other users of the software application comprises outputting information explaining a level of similarity between the user and the identified similar users based on calculated distance metrics between the user and the identified similar users.

7. The method of claim 1, further comprising outputting, to the user of the software application, recommendations related to the software application based on recommendations delivered the identified similar users.

8. A system, comprising:

a memory having executable instructions stored thereon; and a processor configured to execute the executable instructions to cause the system to:

generating, from a transaction history data set for a user of a software application, a grouped data set including transactions grouped by counterparty in the transaction history data set;

generate, from the grouped data set, a feature vector representing the user of the software application and including a plurality of features describing relationships between the user and a plurality of counterparties in the transaction history data set;

generate a first decision tree for the user of the software application based on the feature vector and a plurality of second decision trees for other users of the software application, wherein the first decision tree and the plurality of second decision trees comprise trees having a plurality of paths terminating in a similar or different classification, and wherein the plurality of paths distinguishes a user associated with a decision tree with other users of the software application;

for each respective decision tree of the plurality of second decision trees for other users of the software application:

calculate a distance metric between the first decision tree to the respective decision tree, and identify a user associated with the respective decision tree as a similar user based on the calculated distance metric and a threshold distance metric; and output, to the user of the software application, information identifying similar users from the other users of the software application.

9. The system of claim 8, wherein in order to generate the grouped data set, the processor is configured to generate a plurality of records from the transaction history data set, each record including an identifier of the respective user as a primary key and a unique counterparty as a secondary key.

10. The system of claim 8, wherein in order to generate the feature vector representing the user of the software application, the processor is configured to generate, based on the grouped data set, a vector including information derived from counterparties in the transaction history data set.

11. The system of claim 8, wherein the decision trees comprise trees generated to a defined depth.

12. The system of claim 8, wherein in order to output the information identifying similar users from the other users of the software application, the processor is configured to output information explaining a level of similarity between the user and the identified similar users based on the calculated distance metrics between the user and the identified similar users.

13. The system of claim 8, wherein the processor is further configured to output, to the user of the software application, recommendations related to the software application based on recommendations delivered the identified similar users.

* * * * *